Feb. 14, 1956 W. M. HARRISON 2,734,529
FLUID FLOW CONTROL VALVES
Filed April 3, 1952 6 Sheets-Sheet 1

Inventor
Walter M. Harrison

By
Attorney

Inventor
Walter M. Harrison
By [signature]
Attorney

Feb. 14, 1956   W. M. HARRISON   2,734,529
FLUID FLOW CONTROL VALVES

Filed April 3, 1952   6 Sheets-Sheet 4

Inventor
Walter M. Harrison
By
Attorney

Feb. 14, 1956  W. M. HARRISON  2,734,529
FLUID FLOW CONTROL VALVES
Filed April 3, 1952  6 Sheets-Sheet 5

Inventor
Walter M. Harrison
By
Attorney

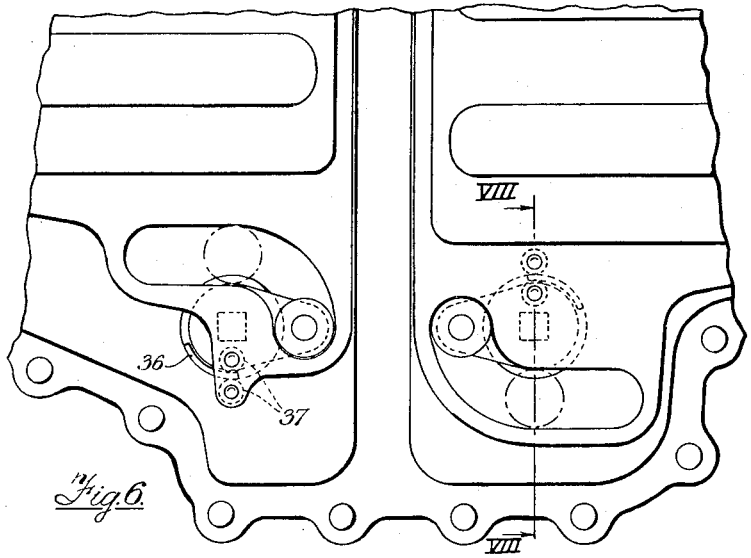
Fig. 6.
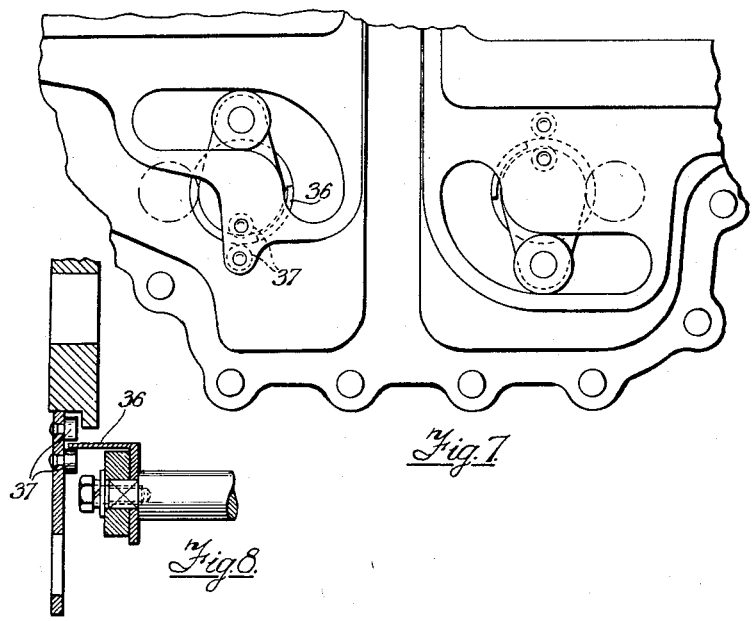
Fig. 7.
Fig. 8.

United States Patent Office 2,734,529
Patented Feb. 14, 1956

2,734,529

FLUID FLOW CONTROL VALVES

Walter Mostyn Harrison, Cefn Coed, near Merthyr Tydfil, South Wales, assignor to Teddington Aircraft Controls Limited, Cefn Coed, near Merthyr Tydfil, South Wales Application April 3, 1952, Serial No. 280,425

Claims priority, application Great Britain April 12, 1951

10 Claims. (Cl. 137—628)

This invention relates to the control of fluid flow and more particularly to the selective control of air or other gas flow between two pairs of passages or conduits, the object of the invention being the provision of a novel or improved valve for this purpose which will control effectively the flow of air or gas at comparatively high temperatures and/or pressures, which will prevent leakage into or from one or more of said passages when the movable valve means are in a position to close said passage or passages, and which will provide a wide range of selective interconnection of the respective passages with only a relatively small range of travel of the movable valve means so reducing to a minimum the force necessary to operate the valve.

The present invention has many applications where selective control of fluid flow through pairs of passages is required and one particular use of the invention is in relation to air heating or cooling systems where an air stream is conducted successively through two or more stages each comprising an air treating unit and a controllable by-pass around said unit. Thus, for example, on aircraft fitted with jet engines it is known to utilize the hot air supply from the engine compressor for cabin conditioning, said air stream being led through a first cooling stage embodying a pre-cooler and a controlled by-pass around said cooler and then through a second cooling stage using a second cooling device and which also includes an associated by-pass, and it is a specific object of the present invention to provide a single, dual acting control valve for regulating the air flow through both said cooling stages and which will provide a progressive degree of cooling proportional to the degree of movement of an operating member from an initial position so permitting accurate control of the cabin temperature to be obtained.

According to the invention a control valve for the purpose mentioned comprises a housing embodying two inlet ports and two outlet ports all communicating with a common valve chamber or manifold, flow regulating means to each port consisting of a fixed metal grid extending across the port and a grid-like gate member formed of or lined with carbon or other self-lubricating material and arranged to slide upon and co-operate with the metal grid, and means for actuating the gates, said gate actuating means being interconnected in such manner as to provide by the operation of a common driving shaft or equivalent member a selective and graduated interconnection of the inlet and outlet ports.

Preferably, the actuating means for the gates of one pair of ports are so interconnected that the gates move in unison but in opposite respect, that is, movement of either gate in the direction to close the related port is accompanied by an equivalent movement of the other gate towards the fully open position, the actuating means for the other pair of gates being similarly interconnected and the arrangement being such that an initial range of movement of the driving shaft from one limit position provides progressive change of flow from one inlet port to the other inlet port into the valve chamber with discharge therefrom through one outlet port only whilst a further range of movement of the driving shaft provides progressive change of flow from the said outlet port to the other outlet port with inflow mainatined through said second-mentioned inlet port only.

In order that the invention may be more fully understood reference will now be made to the accompanying drawings wherein.

Figure 1:
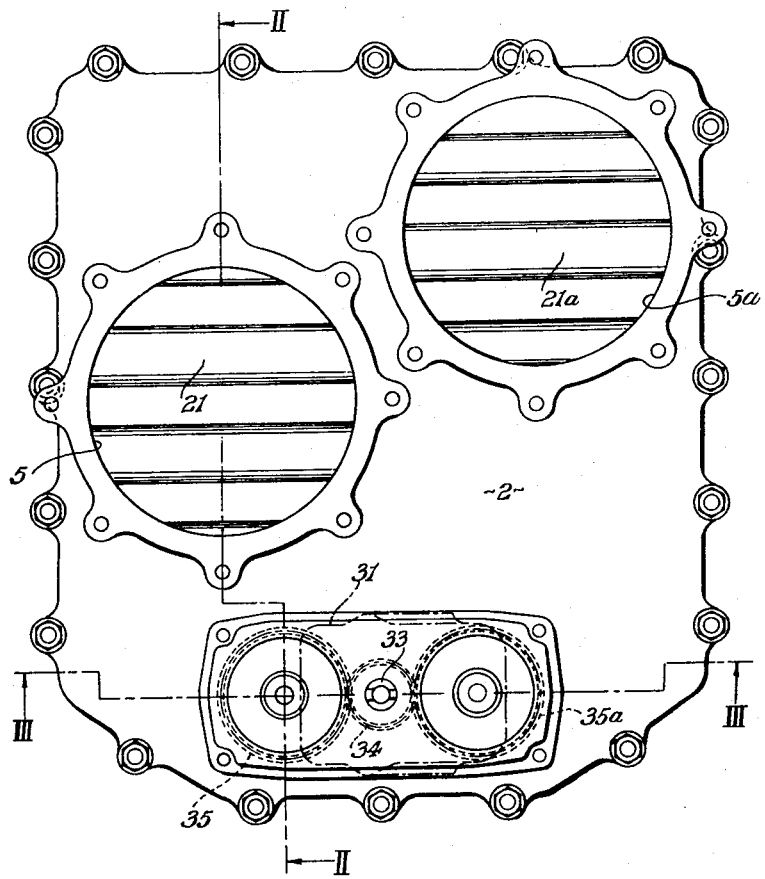
Fig. 1 is an end view of a preferred form thereof.
Figure 2:
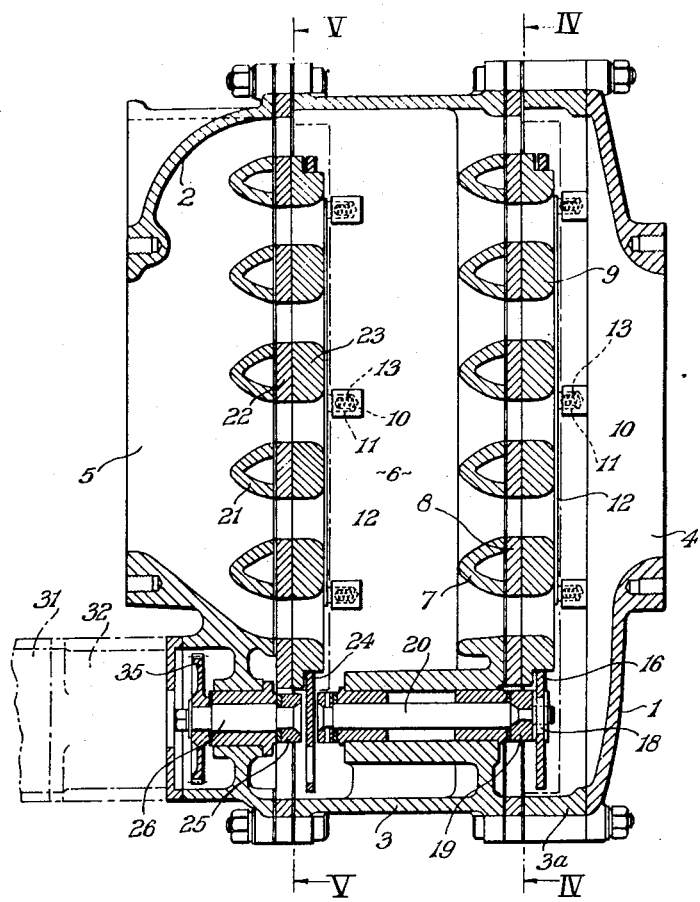
Fig. 2 is a sectional elevation on the line II—II of Fig. 1.
Figure 2A:
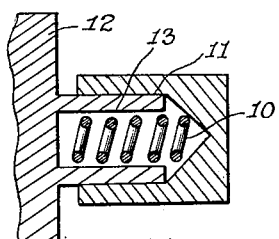
Fig. 2a is a sectional enlargement of a detail of construction of Fig. 2.
Figure 4:
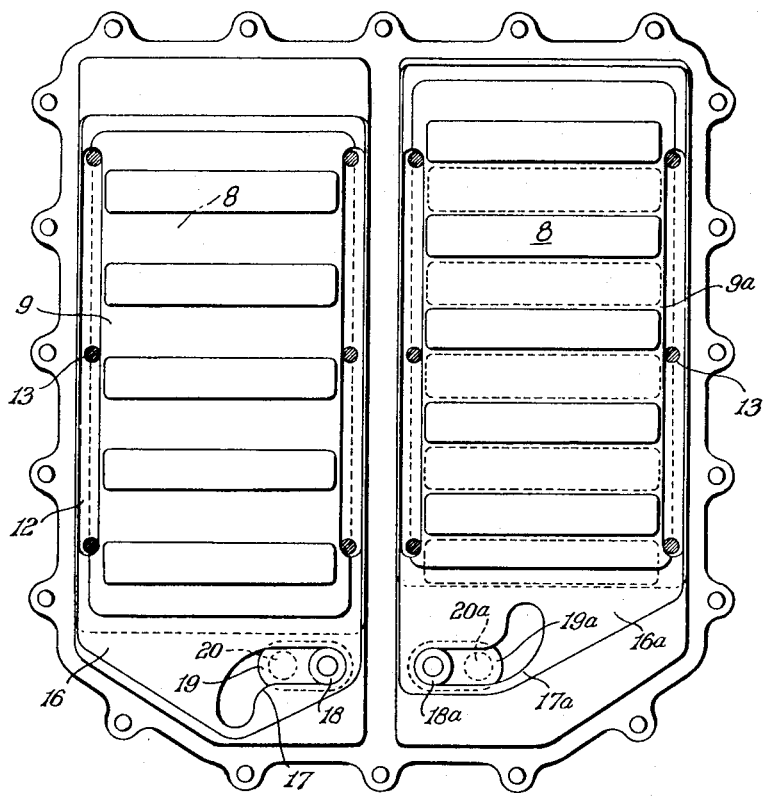
Figure 5:
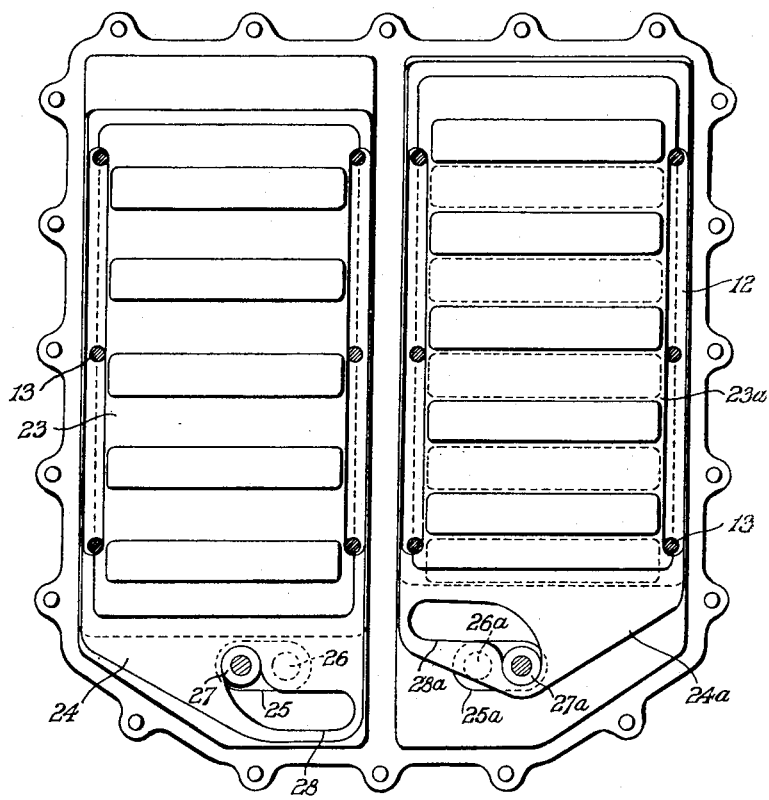

Fig. 4 is a sectional end view on the line IV—IV of Fig. 2 and showing the arrangement of the inlet port control gates, Fig. 5 is a view similar to Fig. 4 but taken on the line V—V of Fig. 2 and showing the arrangement of the outlet port control gates, Fig. 6 is a fragmentary view of a modified gate structure embodying a gate locking mechanism, Fig. 7 is a view similar to Fig. 6 but showing the locking mechanism in the inoperative position, and Fig. 8 is a cross section taken on the line VIII—VIII of Fig. 6.

The control valve now to be described has been designed particularly for use in an air conditioning system of the kind previously mentioned, the valve being inserted at the junction of the two cooling stages to proportion the flow of air between the cooling devices and their associated by-passes, but it will be understood that the valve has other uses.

Referring now to Figs. 1–5 of the drawings, it will be seen that the valve housing consists of two end caps 1, 2 bolted to two contiguous cylindrical sections 3, 3a all formed as castings of aluminum or other light metal, the cap 1 embodying a pair of inlet ports 4, 4a and the cap 2 a pair of outlet ports 5, 5a which in this instance are aligned with the ports 4, 4a although they may be otherwise disposed if desired. The inlet ports open into a central valve chamber 6 and are provided with separate air flow regulating means consisting of fixed grid structures 7, 7a extending across the respective ports, the grid bars being cast integrally with the housing section 3 and having preferably a streamline cross section as shown in Fig. 2, a metal liner 8 on the inlet side of said grids and correspondingly slotted, the liner being common to the two grids and being located in position by clamping at its periphery between the housing sections 3 and 3a, and grid-like gate members 9, 9a which co-operate respectively with the fixed grids 7, 7a and are guided for vertical sliding movement upon the liner 8. The gates are made of or faced with carbon or other self-lubricating material and the depth and spacing of the slots or apertures in the gates are such that in one limit position of a gate the slots therewith are aligned with the slots between the bars of the related fixed grid as shown in Fig. 2 to permit substantially unobstructed gas flow through the port whilst in the other limit position of the gate its slots are aligned with the said bars to close the port completely.

To ensure smooth sliding movement of the gate and an effective sealing of the gas flow passages, when necessary, the gates 9, 9a are guided at their side edges by the side walls of the housing and they are spring loaded by a series of compression springs 10 located in pockets 11 formed in the casting 3a and acting upon strips or runners 12, preferably of stainless steel, said springs serving to press the gate into close engagement with the fixed grids 7, 7a. The springs 10 may be loosely accommodated in the pockets 11 and bear directly upon the runners 12, or as shown in Fig. 2, the springs may be located in tubular plungers 13 which have a sliding fit in the pockets 11 and are secured at their outer ends to the runners, this arrangement having the advantage that it dispenses with the need of providing any additional means for retaining the runners in position. Such a spring mounting is disclosed more fully in my co-pending application Serial No. 274,411 filed March 1, 1952. It will be noted that liner 8 is clamped along its mid-section between a vertical rib 14 integral with the casting 3a and a vertical web 15 integral with casting 3 so that when one of the inlet ports is closed by its respective gate member leakage between the two inlet ports, which might otherwise arise where the two fluid streams are at substantially different pressures, is prevented.

The gates 9, 9a are rebated around their edges and fit within frame-like actuating members 16, 16a having extensions at the lower ends formed with slots 17, 17a said slots consisting of continuous straight and curved sections as shown in Fig. 4 and being engaged by rollers 18, 18a carried by cranks 19, 19a fast on operating shafts 20, 20a.

The outlet ports 5, 5a which open out of the chamber 6, are controlled in like manner to the inlet ports, the control means comprising fixed grids 21, 21a integral with end cap 2, a metal liner 22 therefor, spring pressed, grid-like gate members 23, 23a of carbon or other self-lubricating material, gate actuating members 24, 24a and cranks 25, 25a fast on operating shafts 26, 26a and having roller and slot connections 27, 28 and 27a, 28a with the frame members 24, 24a, see Fig. 5.

Figure 3:
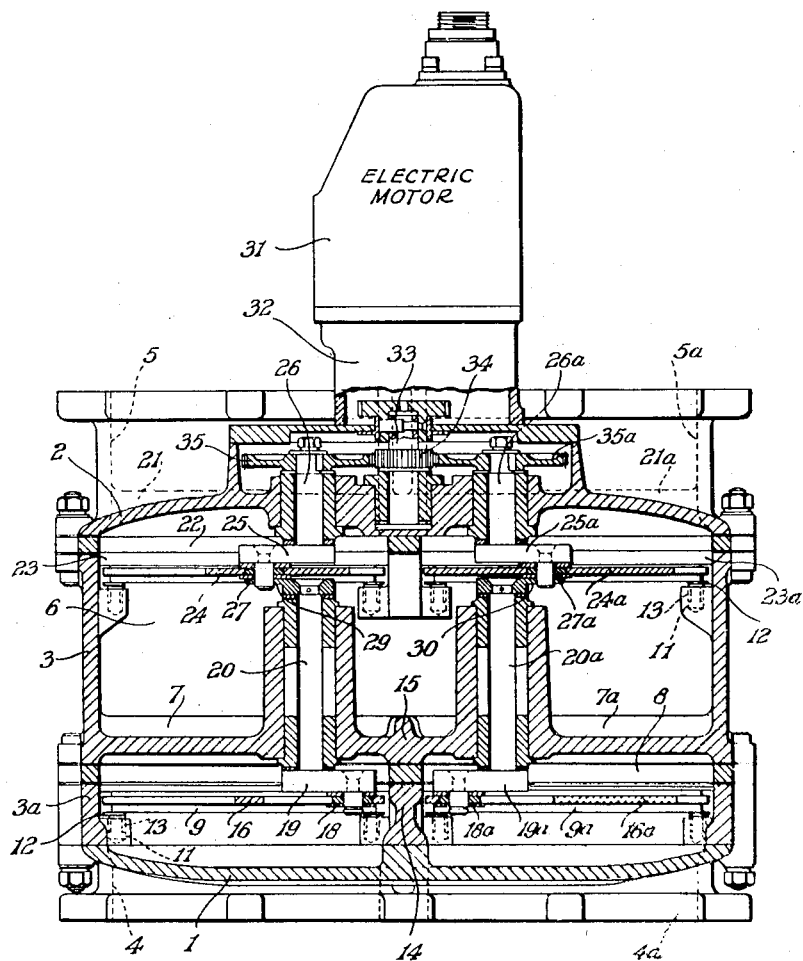
Fig. 3 is a transverse section on the line III—III of Fig. 1.

Referring to Fig. 3, it will be seen that shafts 20 and 26 are axially aligned and that the pin in crank 25 carrying the roller 27 is also received in a radial arm 29 mounted fast on the shaft 20 so that shaft 26 drives shaft 20. In a similar manner a radial arm 30 on shaft 20a provides a driving connection between shafts 26a and 20a.

In the arrangement shown, there is provided an electric motor 31 driving through a reduction gear 32, a main driving shaft 33, the latter carrying a gear wheel 34 which meshes with gear wheels 35, 35a on the shafts 26, 26a so that these shafts are rotated synchronously and in like direction. The electric motor may be substituted by an air driven motor or other power means, or the valve may be hand operated, any suitable means being employed for ensuring synchronized rotation of shafts 20, 20a, 26 and 26a.

The manner in which the valve operates will now be described in its application to the air conditioning system previously mentioned, the inlet ports being connected to the cooler conduit and the by-pass conduit of the first cooling stage and the outlet ports to the cooler conduit and the by-pass conduit of the second cooling stage. The drawings show the gate members in limit positions, the gate members 9 and 23 being in the fully open position and the gate members 9a and 23a in the fully closed position, this arrangement providing full air flow through the two by-pass conduits with the two cooler conduits completely shut off. Thus the hot air from the engine flows straight through to the cabin without any degree of cooling.

Upon rotation of the crank shafts up to 90° in an anti-clockwise direction (Figs. 4 and 5) from the position shown, the crank 19 and roller 18 will impart a lifting movement to gate member 16 while travelling along the straight portion of slot 17, whilst crank 19a and roller 18a will in similar manner impart a downward movement to gate member 16a. During this first 90° of crank shaft movement the rollers 27, 27a merely travel around the curved portions of the slots 28, 28a imparting no movement to the gate members 23, 23a so that any setting of the crank shafts within said 90° range will effect a proportionate flow of air between the two inlet ports, that is, between the cooler and by-pass conduits of the first cooling stage, with the by-pass completely shut off at 90°, but the air will continue to flow through the by-pass only of the second cooling stage by way of outlet port 5. When the crank shafts are rotated beyond the 90° setting, the rollers 27, 27a now in the straight portions of slots 28, 28a commence reversing the positions of the gate members 23, 23a, that is progressively closing outlet port 5 and opening outlet port 5a, until at the end of a further 90° of crank shaft movement the by-pass of the second cooling stage is completely shut off and all air flow is through the second stage cooler.

During this second 90° of movement the rollers 18, 18a are travelling along the curved portions of slots 17, 17a so that there is no further change of position of the gate members 16, 16a, air flow remaining through the first stage cooler conduit only. Thus it will be seen that a 180° range of crank shaft movement will provide a progressively increasing degree of cooling, which at any setting is substantially proportional to the angular displacement of the crank shafts, the initial setting putting to use the by-pass conduits only so that there is no cooling and the 180° setting passing all air through both coolers to obtain the maximum degree of cooling. Moreover, it will be noted that when either of a pair of ports is being closed the other port of the pair is being opened proportionally so that the passage through the valve has at all times a constant cross sectional area with substantially straight through flow.

With the construction above described it will be noted that when a pair of gates have reached a limit position and the actuating cranks have travelled wholly or partly through the further 90° of idle motion, the gates are capable of limited reverse movement due to the clearances which have to be allowed between the crank rollers and the slots in the gates. In actual practice, the fluid pressure acting on the gates is sufficient normally to hold them stationary but under conditions of severe vibration the gates may move back a short distance. Figs. 6–8 illustrate a locking mechanism which prevents such non-intentional movement of the gates under the conditions mentioned. As shown, each gate actuating crank has fast therewith an arcuate locking strip 36 which co-operates with a pair of pins, studs or equivalent abutments 37 mounted in slightly spaced relation upon the associated gate. Over the operative range of movement of the crank, the attached locking strip is disposed out of the path of travel of the pins 37 but at the termination of the operative stroke the leading edge of the locking strip has been brought to a position immediately adjacent the pins, see Fig. 7. Thereafter, as the crank proceeds over the range of idle movement the locking strip 36 travels between the associated pair of pins 37 positively holding the gate in its limit position and preventing any displacement of the gate by vibration.

I claim:

1. In a fluid flow control valve, a housing structure defining two inlet ports and two outlet ports and including a manifold chamber common to said ports, means regulating the flow of fluid between said ports and manifold chamber, said regulating means including a fixed grid structure for each said port and an associated gate structure, means mounting each gate structure for movement relatively to its grid structure for opening and closing openings through its said grid structure, common actuator means connected with said gate structures for producing movement thereof into the open and closed position, said common actuator means including means inter-connecting said actuator means with each of said gate structures, so that the gate structures at the inlet and outlet ports are moved by said common actuator means in unison but in opposite sense, said inter-connecting means including lost motion means providing that for an initial range of movement of said common actuator means, the gate structures of one pair of said ports are progressively moved in unison and opposite sense while the gate structures of the other pair of ports remain stationary.

2. Fluid flow control valve structure as claimed in claim 1, said inter-connecting means comprising means connecting the gate structure of each inlet port with said common actuator for movement to progressively move their respective gate structures in unison and in opposite sense and means connecting the gate structure of each outlet port with said common actuator to progressively move their respective gate structures in unison and in opposite sense.

3. Fluid flow structure as claimed in claim 1, said common actuator means comprising a rotatable shaft and said interconnecting means comprising crank arms connected to be actuated from said shaft and connected with their respective gate structures by a roller and slot connection, each said slot including a portion in which movement is imparted to its gate structure upon rotation of said shaft and a portion in which no movement takes place.

4. A fluid flow control valve comprising a housing embodying two inlet ports and two outlet ports and including a common valve chamber or manifold, said inlet and outlet ports being in communication with said common valve chamber or manifold, flow regulating means for each said port consisting of a fixed metal grid extending across the port and a self lubricating grid-like gate member, means mounting said gate member for sliding movement with respect to its metal grid, means for actuating the gates, means inter-connecting the gates of one pair of ports with said actuator means so that these gates move in unison but in opposite respect, means inter-connecting the other pair of gates with said actuator means so that an initial range of movement of the said actuator means from one limit position provides progressive change of flow from one inlet port to the other inlet port into the common valve chamber with discharge therefrom through one outlet port only, said actuator means including a further range of movement which provides progressive change of flow from the said outlet port to the other outlet port with inflow maintained through said second mentioned inlet port only.

5. A control valve as claimed in claim 4, including means guiding said gates for rectilinear sliding motion relatively to their said grids, crank mechanisms including cranks connected with the gates of one said pair of ports and further cranks connected with the gates of the other pair of ports, and means connecting said crank mechanisms for synchronized actuation by said actuator means, said cranks being connected with their respective gates by roller and slot connections which include operative and idling ranges.

6. A control valve as claimed in claim 4, said gates incorporating frame-like actuators having slots and said common actuator means including a rotary shaft and cranks operated from said shaft and engaged one with each said frame-like actuator, said cranks carrying rollers engaged in the slots of their respective frame-like actuators and said slots comprising straight and curved positions, constituting said ranges of movement of said actuator means, said straight slot portions providing an operative range in which said gates are moved and an idling range in which there is no movement of the gates.

7. A control valve as claimed in claim 4, said actuator means including a main drive shaft and a pair of shafts each with two cranks, one pair of the cranks on said shafts being connected to move one pair of the said gates in one direction and the other cranks on said shafts being connected to move the other pair of said gates in the opposite direction but in unison with said first mentioned gates, and means connecting said pair of shafts for simultaneous rotation by said drive shaft.

8. A fluid flow control valve comprising a housing embodying two inlet ports and two outlet ports and including a common valve chamber or manifold, said inlet and outlet ports being in communication with said common valve chamber or manifold, flow regulating means for each said port consisting of a fixed metal grid extending across the port and a self lubricating grid-like gate member, means mounting said gate member for sliding movement with respect to its metal grid, spring means urging said gates into engagement with their grids, means for actuating the gates, means inter-connecting the gates of one pair of ports with said actuator means so that these gates move in unison but in opposite respect, means inter-connecting the other pair of gates with said actuator means so that an initial range of movement of the said actuator means from one limit position provides progressive change of flow from one inlet port to the other inlet port into the common valve chamber with discharge therefrom through one outlet port only, said actuator means including a further range of movement which provides progressive change of flow from the said outlet port to the other outlet port with inflow maintained through said second mentioned inlet port only.

9. A control valve as claimed in claim 4, including means guiding said gates for rectilinear sliding motion relatively to their said grids, a plurality of cranks, means connecting said cranks for synchronized actuation by said actuator means, and means connecting a said crank with each said gate, said connecting means including roller and slot connections between said crank and its corresponding gate and said connections including operative and idling ranges, locking means associated with each said crank and complementary means on each gate, said locking means cooperating with said complementary means to hold the gate in a limit position during the said idling range.

10. A control valve as claimed in claim 4, including means guiding said gates for rectilinear sliding motion relatively to their said grids, a plurality of cranks, means connecting said cranks for synchronized actuation by said actuator means, and means connecting a said crank with each said gate, said connecting means including roller and slot connections between said cranks and their corresponding said gates and said connections including operative and idling ranges, locking means associated with each said crank and complementary means on each gate, said locking means co-operating with said complementary means to hold the gate in a limit position during the said idling range, said locking element comprising an arcuate strip rotatable with each crank, and a pair of abutments carried by each gate, said arcuate strips extending between said abutments.

References Cited in the file of this patent

UNITED STATES PATENTS

| | | |
|---|---|---|
| 1,283,818 | Laun | Nov. 5, 1918 |
| 1,737,040 | Bulkeley et al. | Nov. 26, 1929 |
| 1,888,242 | Sholtes | Nov. 22, 1932 |
| 2,601,231 | Smith | June 24, 1952 |